Figure 1:
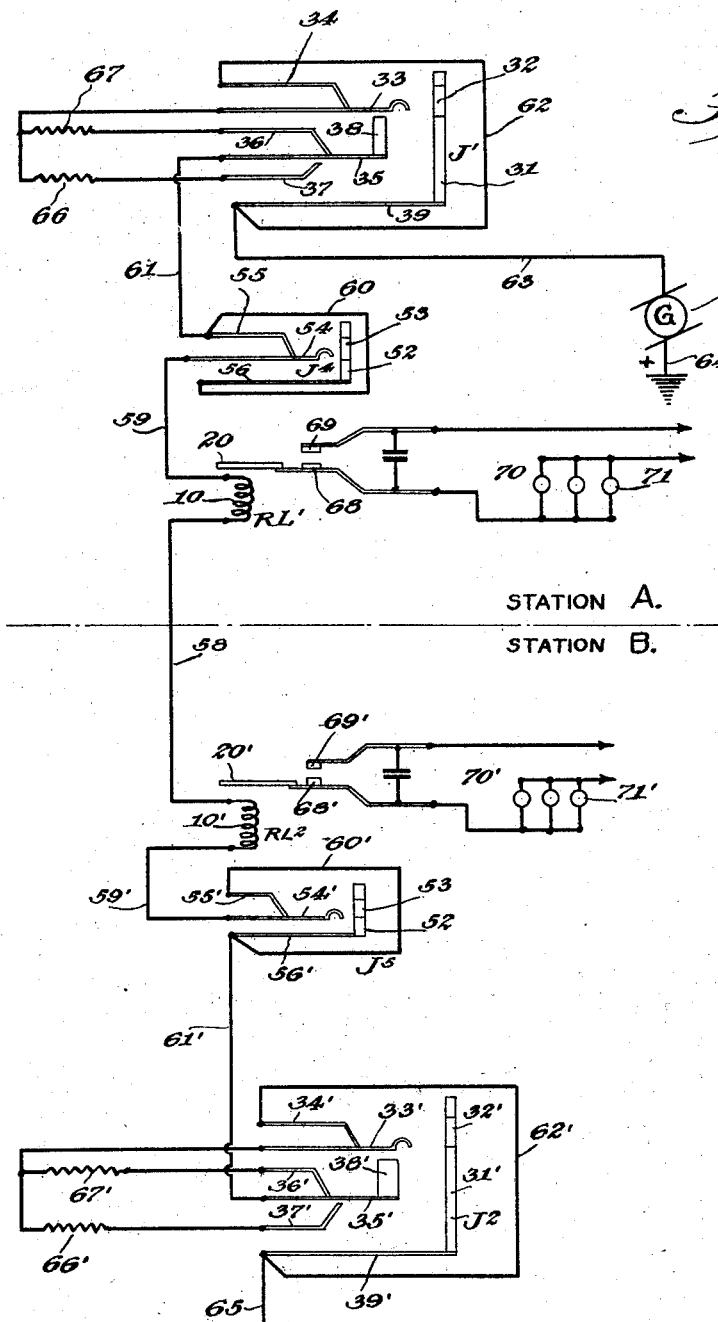

Nov. 25, 1930.   F. M. ANDERSON   1,783,067
ELECTRIC POWER CIRCUIT CONTROL SYSTEM
Filed Jan. 12, 1929   3 Sheets-Sheet 1

STATION A.
STATION B.

WITNESSES

INVENTOR
F. M. Anderson,
BY
ATTORNEY

Nov. 25, 1930. F. M. ANDERSON 1,783,067
ELECTRIC POWER CIRCUIT CONTROL SYSTEM
Filed Jan. 12, 1929   3 Sheets-Sheet 2
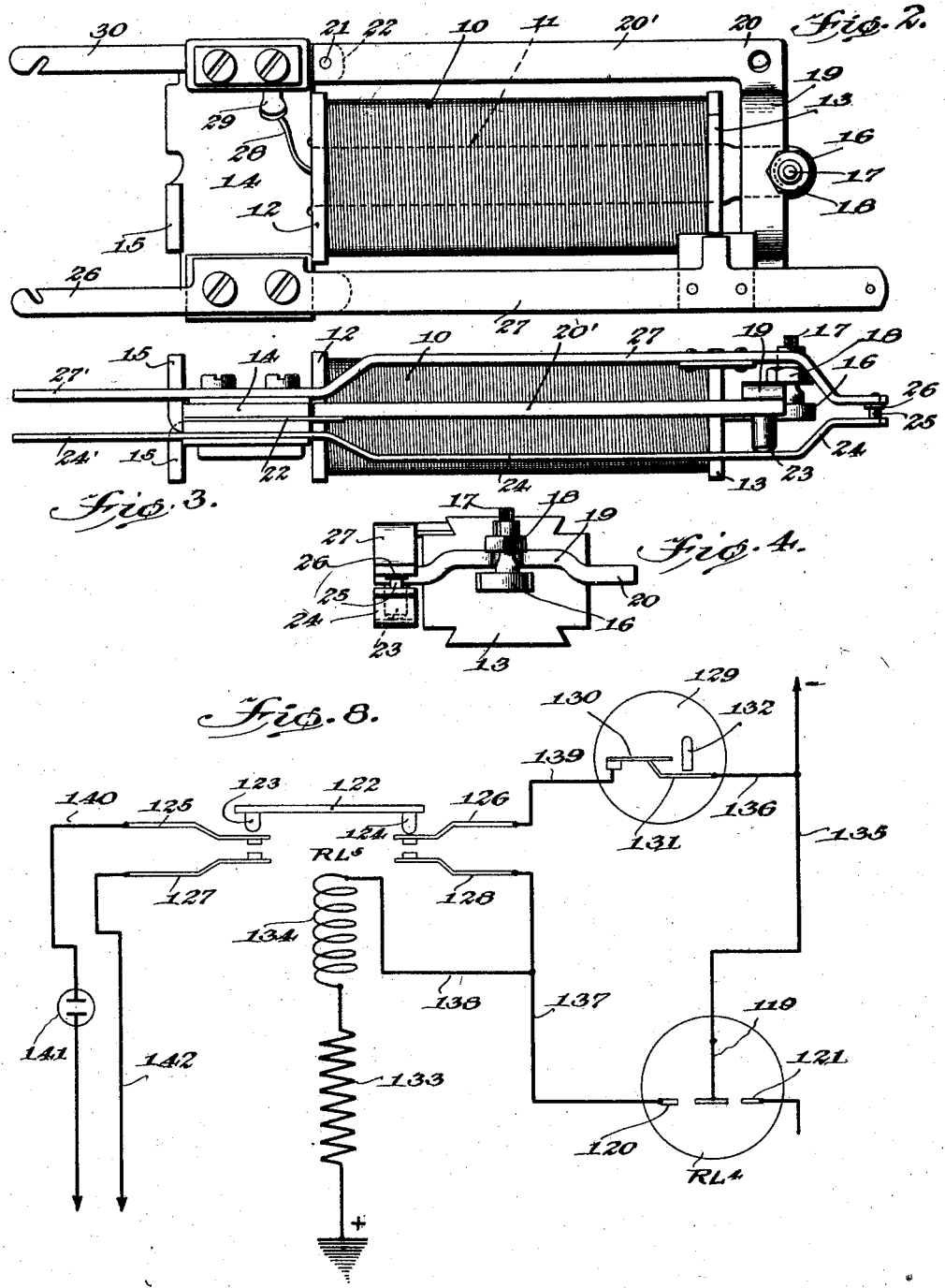
WITNESSES
INVENTOR
F. M. Anderson,
BY
ATTORNEY

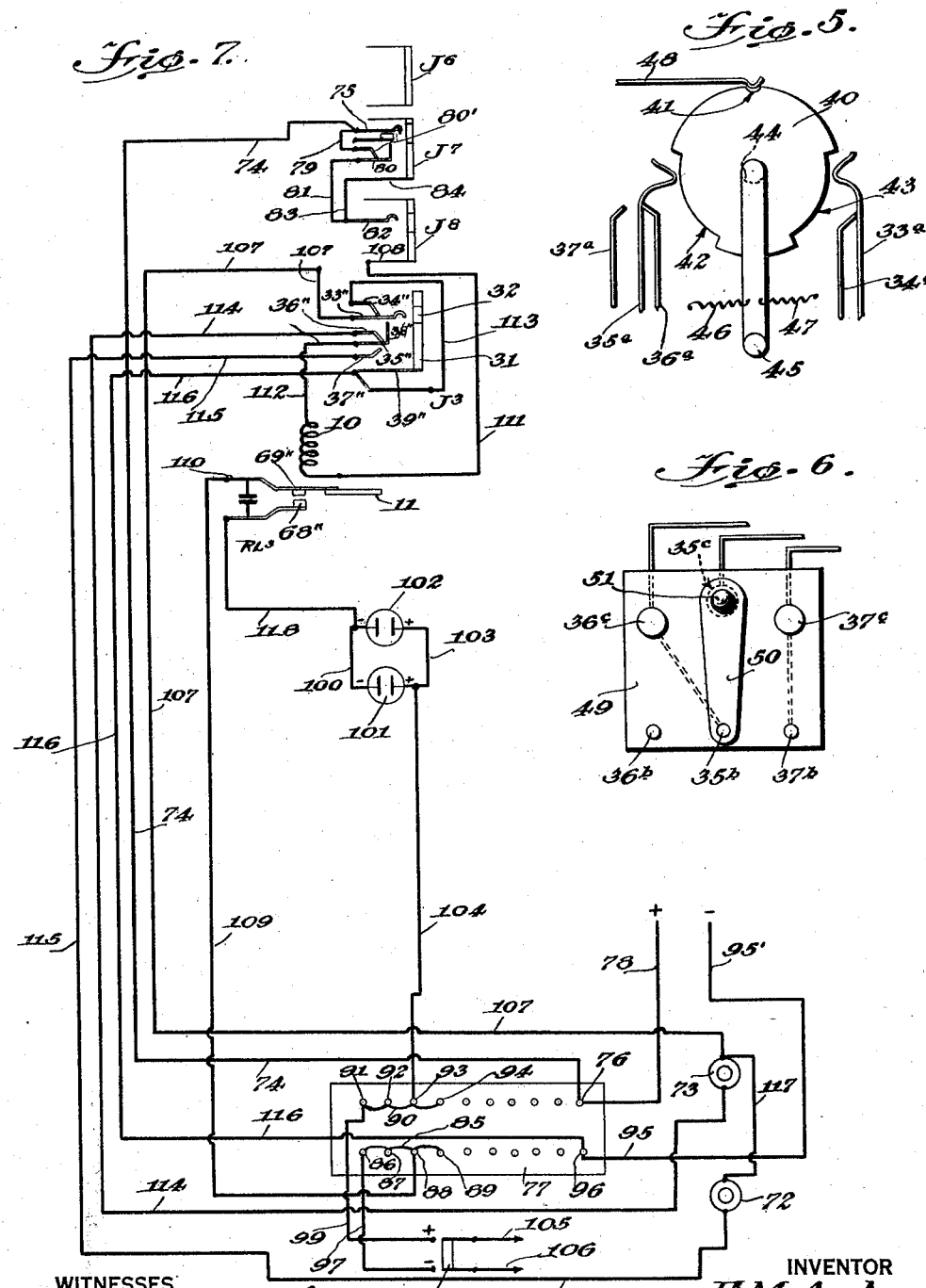

Patented Nov. 25, 1930

1,783,067

UNITED STATES PATENT OFFICE

FRED M. ANDERSON, OF NEW ORLEANS, LOUISIANA

ELECTRIC POWER CIRCUIT CONTROL SYSTEM

Application filed January 12, 1929. Serial No. 332,006.

This invention appertains to improvements in electric power circuit control systems, and has for its main object to provide means whereby a local electric power circuit (one at each station) may be readily controlled from either of two stations, situated one remote from the other.

Another object of the invention is to provide a control device or apparatus of the class set forth, which will be highly efficient in operation, extremely effective in the elimination of undue power waste and mechanical wear, and comparatively low in cost of manufacture, installation and maintenance.

Among other numerous advantages of the present invention, one resides in the fact that the device or apparatus (when installed on a Western Union simplex circuit, Table 31-A) may be made up of a discarded brake relay of a Western Union synchronizing unit and one added jack switch; and another that it is equally ideal for application to such circuits as the Western Union simplex, the Postal Telegraph teletype, and the Morkrum-Kleinschmidt teletype.

With the foregoing and other equally important objects and advantages in view, the invention resides in the certain new and useful combinations, constructions and arrangements of devices, parts and circuits as will be hereinafter more fully described, set forth in the appended claims, and illustrated in the accompanying drawings, in which:

Figure 1 is a diagrammatical view of a two station hook-up embodying a practical application of the invention, Figure 2 is a side elevation of the form of relay employed at each of the stations of the circuit as in Figure 1, Figure 3 is a bottom plan view thereof, Figure 4 is a front end elevation of the same, Figure 5 is a front elevation of a special form of cam switch, which may be employed in lieu of the main control of jack switches, Figure 6 is a similar view of a form of three-point switch which may be substituted for either of the cam or jack switches aforesaid.

Figure 7 is a diagrammatical view of a simplex circuit (Western Union Table 31-A), as modified in accordance with the present invention, and Figure 8 is a local hook-up for each of the control stations when connected together by means of a duplex line.

Referring to the drawings, wherein similar characters of reference designate corresponding parts throughout the several views thereof, and more particularly to Figures 1 to 6 inclusive thereof, the invention consists essentially, as shown therein by way of example, in the provision of a local control circuit at each of the two stations A and B (Figure 1), which includes a relay RL, a main control jack switch J, the relays for the two stations A and B to be hereinafter referred to as $RL^1$ and $RL^2$, and the jack switches cooperative therewith as $J^1$ and $J^2$, respectively. The local circuits aforesaid are interconnected by a line circuit extending between the two stations A and B.

As particularly illustrated in Figures 2 to 4 inclusive of the drawings, each of the relays RL comprises a magnetizing coil 10, which is wound around a soft iron core 11, and between end plates 12 and 13. The rear end plate 12 is preferably of an insulating material, such as fiber, and the end of the core 11 projecting outwardly through the same is enlarged, as at 14, and has its outer rear edge formed to provide oppositely angled ears 15, which are apertured to receive suitable fastenings for the securing of the same in a desired operative position, when in use. The forward end of the core, constituting the pole piece 16 is projected outwardly through the front end plate 13, and is provided with an aperture at its extreme outer end through which a brass screw 17 is passed. A lock nut 18 is threaded on the free end of the screw 17 to serve as an adjustable stop for limiting the operative movement of the adjacent connected end portion 19, of a substantially U-shaped armature 20, which is positioned between the inner side of the lock nut 18 and the opposed face of the pole piece 16. The opposite legs 20' of the armature extend rearwardly, and in parallel relation to the opposite sides of the coil 10, and are attached by means of rivets or the like 21 to resilient tongues or extensions projecting from the forward edge of a metal plate 22, which is secured at one side of the enlarged portion 14 of the core 11.

Mounted in one corner of the connected portion 19 of the armature 20, and projecting to one side thereof, is a fiber stud 23, which is cooperative with an adjacent spring arm 24, projecting forwardly from its mounting on the enlarged portion 14 of the core 11. This spring arm 24 extends forwardly of the enlarged core part 14 in parallel relation to and at one side of one of the legs 20' of the armature 20, and has its extreme forward end angularly bent inward to a point substantially in the plane of the opposed side of the latter. The free end of this angled end of the arm 24 is provided with a contact 25 at its inner side, which is normally disposed in abutting relation with a similar contact 26 carried on the correspondingly angled end portion of a companion stationary arm 27 extending parallel to the opposite side of the armature 20, and mounted on the enlarged portion 14 of the core 11 at its rearwardly directed end. The free ends 28 of the coil 10 lead through the rear end fiber plate 12, and are attached to tabs 29 projecting from metal terminals 30 extending rearwardly from the enlarged portion 14 of the core 11, from which they are supported and insulated. The rearwardly directed free end portions 24' and 27' of the contact arms 24 and 27 respectively, also project outwardly from the enlarged portion 14 of the core 11, and in parallel relation to the terminal strips 30 to have line conductors connected thereto, as will be hereinafter more fully explained.

In the operation of one of these relays RL, when current is passed to the coil 10, the core 11 is energized, and the armature 20 is attracted to the pole piece 16. During the movement of the armature 20 at this time, the fiber stud 23 strikes against the spring contact arm 24, and causes the same to break the circuit at the contacts 25 and 26; also the arm 24 is moved against its tension in the same direction of the movement of the armature 20, and until the latter strikes against the pole piece 16. Now, when the coil 10 and the core 11 are de-energized, the tension of the contact arm 24 and of the spring tongues 22, supporting the armature 20, acts to return these parts to normal position when the contact 25, on the arm 24, will make the circuit at the stationary contact 26, and the armature part will come to rest against the stop formed by the lock nut 18 on the screw 17.

The adjustments of each of the relays RL are as follows: The air gap between the pole piece 16 and the armature will preferably be twenty one-thousandths of an inch (.020"), the spring tension of the movable contact spring 24 shall be such that when the relay armature 20 is at rest against the stop nut 18, a current of seventy (70) milliamperes flowing through the coil 10, a magnetic field will be produced of such strength that the armature 20 will be attracted to the pole piece 16, and then, when the current is reduced to fifty-five (55) milliamperes, the armature 20 will be held against the pole piece 16, and, when the armature 20 is at rest against the stop nut 18, a current of sixty (60) milliamperes will not produce a magnetic field strong enough to attract the armature 20 to it. It is to be here noted that the circuit must not be broken when the current is reduced. The contact spring 24 shall be so adjusted that, when the armature 20 is held against the pole piece 16, there will be an air gap of ten one-thousandths of an inch (.010") between the contacts 25 and 26. A slight clearance is also provided between the contact spring 24 and the armature fiber stud 23, such clearance being preferably two one-thousandths of an inch (.002"), when the armature is at rest against the stop nut 18.

Each of the jack switches J¹ and J² (Figure 1), and also the jack switch J³ (Figure 7) consists of a face plate 31, in which is provided an opening 32 for the insertion of a metal or a fiber dummy type of plug connector (not shown) therethrough. Mounted in the rear of the plate 31, and in line with the plug opening 32 is a main contact spring 33, which has its forward end bent in a manner to be engaged by a plug for its make and break operative movements, with respect to a pair of oppositely spaced contact springs 34 and 35. Cooperative with the contact spring 35 are a pair of contact springs 36 and 37, one spaced at each side of the same, and, when normally disposed, the contact spring 36 is electrically contacted by the contact spring 35, while the contact spring 34 is similarly contacted by the main contact spring 33. The forward end of the contact spring 35 is provided with an angular fiber extension 38, which is disposed in the path of movement of the forward end portion of the main contact spring 33. so that when the latter is forced by a plug to break contact with the contact spring 34, the same, in turn, forces against the fiber extension 38, and causes the contact spring 35 to break contact with the contact spring 37, all of which happens on the completion of the inward stroke of a dummy type of plug connector. The connection terminal 39 is electrically connected to the face plate 31 for the attaching thereto of certain of the circuit connections to be hereinafter described.

The adjustments of each of these jacks $J^1$, $J^2$ or $J^3$ is as follows: The contact springs 33 and 34 are adjusted so that when either dummy type of plug connector is inserted through the opening 32, the face plate 31, there shall be an air gap between the contacts of ten one-thousandths of an inch (.010″). The contact springs 36 and 37 are so adjusted that when either dummy type of plug connector is being inserted into the jack, the contact spring 35 will touch both momentarily, then, when the inward stroke of the plug is completed, there shall be an air gap of ten one-thousandths of an inch (.010″) between the contact spring 35 and the contact spring 36. When the plug is withdrawn from the jack, there shall be an air gap of ten one-thousandths of an inch (.010″) between the contact spring 35 and the contact spring 37.

The cam type of switching device, as shown in Figure 5, may be substituted for each of the jack switches $J^1$, $J^2$ or $J^3$ in certain instances of the use of the invention, and the same consists of a disk 40 of bakelite or the like, which has its peripheral edge provided with a small notch 41 at its upper side, and elongated notches 42 and 43 at the opposite sides of its lower portion. This disk 40 is fastened to a shaft 44, which has a hand crank or lever 45 attached at one end thereof for its required oscillatory or rocking movement of operation, and opposed springs 46 and 47 are cooperative with opposite sides of the crank or lever 45 to normally sustain the disk in neutral position, in which position a detent spring or the like 48 will engage in the upper notch 41.

Cooperative with the elongated notch 43 is a main contact spring $33^a$, having its upper end crimped, and normally making contact with a fixed contact spring $34^a$, so that when the hand crank or lever 45 is moved to the left hand position, the disk 40 turns with the shaft 44 in a clockwise direction, and thereby causes the high part of its peripheral edge to engage the under side of the crimp of the contact spring $33^a$, and move the latter out of contacting relation with the fixed contact spring $34^a$. Cooperative with the elongated notch 42 is a main contact spring $35^a$, which has its upper end portion crimped and normally making contact with a fixed contact spring $36^a$. Disposed at the side of the main contact spring $35^a$ opposite that opposed to the fixed contact spring $36^a$ is a second fixed contact spring $37^a$. Now, when the hand crank or lever 45 is moved to the right hand position, the disk 40 turns with the shaft 44 in an anti-clockwise direction, thereby causing the high part of the peripheral edge of the disk to engage the under side of the crimped end of the main contact spring $35^a$, and move the latter out of contact with the contact spring $36^a$, and into contact with the fixed contact spring $37^a$.

It is to be noted that in both the jack and cam switch structures, the contacts 36 and 37 of the former, and $36^a$ and $37^a$ of the latter, are so adjusted that the contact of the main spring contacts 35 and $35^a$ is actually broken with respect to the contacts 36 and $36^a$ before the subsequent contact is made thereby with the other of the contacts 37 and $37^a$, and, in the case of the cam switch, this happens when the crimp of the main contact spring $35^a$ has moved onto the highest part of the peripheral edge of the disk 40.

Also, and as shown in Figure 6, a three-point switch may be employed in lieu of either of the jack or cam type of switches above described, and the same is constituted in a base 49, of an insulating material, upon which is mounted at the rear thereof, three terminals $35^b$, $36^b$ and $37^b$, to which circuit conductors are to be attached. The terminal $35^b$ acts as a fulcrum for a switch lever 50, upon which is mounted an insulated handle 51, and by means of which the same can be readily moved to a left-hand, central, or a right-hand position, as occasion may require. Mounted in the front face of the base 49 are three contact points $35^c$, $36^c$ and $37^c$, over which the free end portion of the switch lever 50 rides when moved into and out of contacting relation therewith. The terminal $36^b$ is not to be electrically connected to any circuit, while terminal $35^b$ is electrically connected to the outer left-hand contact point $36^c$, and terminal $37^b$ is similarly connected to the outer right-hand contact point $37^c$. From this, it will be understood that the terminal $35^b$ is disposed centrally between the terminals $36^b$ and $37^b$, and the contact point $35^c$ centrally between the contact points $36^c$ and $37^c$.

The invention also contemplates the use, in certain instances, of a pair of jack switches $J^4$ and $J^5$ (Figure 1), and each of these is made up of a face plate 52, in which an opening 53 is provided for the insertion therethrough of a dummy type of plug connector (not shown). A main contact spring 54, to be actuated by the dummy plug aforesaid is positioned at the rear of the plate 52, and in line with the plug opening 53, and is disposed between a pair of spaced contact springs 55 and 56. The spring contact 55 is normally contacted by the main contact spring 54, and the latter is cooperative therewith only to make and break the circuit therebetween, while the contact spring 56 is supported directly from the plate 52 for purposes to be later explained.

The adjustments of this form of the jack switches are as follows: When either dummy type of plug connector is inserted inwardly through the opening 53 of the face plate 52, there shall be an air gap of ten one-thousandths of an inch (.010") between the contact springs 55 and 56.

In the practical embodiment of the invention, as shown in Figure 1, the several devices hereinbefore specifically described, together with a generator 57, preferably designed to develop a one hundred and twenty volt (120 v.) output, are connected in circuit as follows: The coils 10 of the relays $RL^1$ and $RL^2$, one of which being located at each of the stations A and B, are connected at respective terminals 30 in series by a line conductor 58, and have the other of their terminals 30 connected by conductors 59 and 59' respectively, to the main contact springs 54 and 54' of the jacks $J^3$ and $J^4$. The spring contacts 55 and 55' of the jacks $J^3$ and $J^4$ are, in turn, connected respectively by conductors 60 and 60' to the fixed contact springs 56 and 56', which, in turn, are connected by conductors 61 and 61' respectively, to the contact springs 35 and 35' of the jacks $J^1$ and $J^2$. The contact springs 34 and 34' of the last-named jacks $J^1$ and $J^2$ are connected to the plate contacts 39 and 39' by conductors 62 and 62' respectively, while the plate contact 39 is further connected by a conductor 63 to the negative side of the generator 57. The positive side of the generator 57 is connected directly to ground, as at 64, as is also the plate contact 39' of the jack $J^2$ by a conductor 65, substantially as shown. The main contact springs 33 and 33', and the contact springs 37 and 37' of the jacks $J^1$ and $J^2$ are bridged by resistances 66 and 66', respectively, and additional resistances 67 and 67' are connected between the contact springs 36 and 36' and the bridging circuits of the resistances 66 and 66' at the sides of the latter nearest the main contact springs 33 and 33'. Connected to the contacts 68, 69 and 68', 69' of each of the relays $RL^1$ and $RL^2$ respectively, are the leads forming the power circuits 70 and 70', each of which include a plurality of sockets or the like 71 and 71' for the connecting in on the circuit of any apparatus to be controlled. For the purpose of the present invention, the resistances 66, 66' and 67, 67' are arbitrarily valued at three hundred and eighteen (318) ohms and nine hundred (900) ohms, respectively.

In the practice of the invention, it will be understood that the values of the resistances 66, 66' and 67, 67', and the resistance of the coils 10 of the relays $RL^1$ and $RL^2$, together with the line current values, will be calculated or otherwise proportioned to meet the immediate requirements of a particular circuit, and, therefore, may be other than as stated herein for the sake of clearness of explanation of the operation of the circuit, as shown in Figure 1, which operation is as follows: With the generator 57 operably connected to a suitable power source, and all of the other devices disposed in their normal state of rest, an operator at either of the stations A or B will insert a fiber dummy type of plug connector, as for instance, into the opening 32 in the face plate 31 of the jack $J^1$ at the station A, with the result that the main contact spring 33 breaks contact with contact spring 34, and at the same time main contact spring 33 strikes the fiber angular extension 38 on the contact spring 35, thereby depressing it, and causing the same to start breaking contact with contact spring 36, and to make contact with contact spring 37 before the contact spring 35 actually completes the breaking of the contact with contact spring 36, which occurs only at the completion of the operative movement of the plug inwardly of the opening in the plate 31. The opening of the contact springs 33 and 34 disconnects the negative terminal of the generator 57 from the line, and thereby de-energizes the station A, relay $RL^1$ and the station B, relay $RL^2$. When the relays $RL^1$ and $RL^2$ are de-energized, the contacts 68 and 69 of relay $RL^1$, and of contacts 68' and 69' of relay $RL^2$ closed thereby, closing the local power circuits 70 and 70', associated therewith respectively, on the apparatus to be cut in at the sockets 71 and 71'. By now withdrawing the dummy plug from the jack $J^1$, the several contact springs thereof are returned to their normal positions. Upon the withdrawal of the plug aforesaid, and the returning of the several contacts of jack $J^1$ to their normal positions, a current of fifty-five (55) milliamperes will flow from the negative pole of the generator 57, through conductor 63, through conductor 62, through closed contact springs 34 and 33, through the nine hundred (900) ohm resistance 66, through closed contact springs 37 and 35 of jack $J^1$, through conductor 61, through contact springs 55 and 54 of jack $J^4$, through conductor 59, through the one hundred and three (103) ohm coil 10 of the relay $RL^1$, through the one hundred and seventy-six (176) ohm line conductor 58 to station B, then through the one hundred and three (103) ohm coil of relay $RL^2$, through conductor 59', through closed contact springs 54' and 55' of the jack $J^5$, through conductors 60 and 61', through closed contact springs 35' and 36' of jack $J^2$, through the nine hundred (900) ohm resistance 67', through closed contact springs 33' and 34' of jack $J^2$, through conductor 62' to connection terminal 39' of the jack $J^2$, and from thence to conductor 65 to ground, thereby completing the circuit. The relays $RL^1$ and $RL^2$ are so adjusted that a current of fifty-five (55) milliamperes will not produce a magnetic field strong enough at the pole-pieces 16 to attract the armatures 20 and 20', when the latter are at rest against their back stops 18, the air gap being twenty one-thousandths of an inch (.020"). Therefore, the relay contacts 68 and 69, and also 68' and 69' will remain closed until it is desired at either station to have the apparatus cut off.

In the operation aforesaid, however, it is to be noted that the operator will insert the plug connector into the jack J¹ only momentarily, and then remove it, with the result that the line circuit is opened to the generator 57, and the relays RL¹ and RL² are de-energized. Upon the de-energization of the relays RL¹ and RL², the contacts 68, 69 and 68', 69' thereof close, and this completes the local power circuits 70 and 70' on the apparatus to be cut in at the sockets 71 and 71', which are connected in on these circuits. Immediately thereafter, the line is restored by the withdrawal of the plug connector, and the normal fifty-five (55) milliamperes current again flows through the circuit. The relay contacts 68, 69, 68' and 69' now remain closed until it is desired to cut off the apparatus connected to the local power circuit 70 and 70'. To now cut out the power circuit 70 and 70', an operator at either of the stations A or B will insert a metal dummy type of plug connector, as for instance, into the opening 32 of the jack J¹ at the station A, with the result that the main contact spring 33 breaks contact with contact spring 34, and at the same time, main contact spring 33 strikes the fiber angular extension 38 on the contact spring 35, thereby depressing the same and causing it to start breaking contact with contact spring 36, and to make contact with contact spring 37 before contact spring 35 actually completes the breaking of contact with the contact spring 36, which, as before stated, occurs only at the completion of the operative movement of the plug inwardly of the opening of the plate 31. The opening of the contact springs 33 and 34, in this instance, does not disconnect the negative pole of the generator 57 from the line, but the current is shunted through the metal dummy type of plug connector, so that the complete circuit is now as follows: A current of seventy-five (75) milliamperes will flow from the negative pole of the generator 57 through conductor 63, through connection terminal 39 of the jack J¹, through face plate 31, through metal dummy type of plug connector (not shown), through contact spring 33, through the three hundred and eighteen (318) ohm resistance 67, through closed contact springs 36 and 35 of the jack J¹, through conductor 61, through closed contact springs 55 and 54 of the jack J⁴, through conductor 59, through the one hundred and three (103) ohm coil of relay RL¹, through the one hundred and seventy-six (176) ohm line conductor 58 to station B, then through one hundred and three (103) ohm coil or relay RL², through conductor 59', through closed contact springs 54' and 55' of the jack J⁵, through conductors 60' and 61', through closed contact springs 35' and 36' of the jack J², through the nine hundred (900) ohm resistance 67', through closed contact springs 33' and 34' of the jack J², through conductor 62' of the connection terminal 39' of the jack J², and thence by way of conductor 65 to ground, thereby completing the circuit.

As before stated, the relays RL¹ and RL² are so adjusted that a current of seventy-five (75) milliamperes will produce a magnetic field strong enough at the pole pieces 16, which will attract the armatures 20, when the latter are at rest against their back stops 18, the air gap being twenty one-thousandths of an inch (.020") to the pole pieces 16, and thereby opening the contacts 68 and 69 of relay RL¹, and the contacts 68' and 69' of the relay RL², which thereafter opens the electric power circuits 70 and 70', when the apparatus connected to these circuits at the sockets 71 and 71' will be rendered inoperative. By now withdrawing the metal dummy plug type of connector of the jack J¹, the several contact springs thereof return to their normal positions. However, upon the withdrawal of the aforesaid plug, and the returning of the several contacts of the jack J¹ to their normal positions, a current of fifty-five (55) milliamperes will flow through the circuit, as explained above. The adjustment of the relays RL¹ and RL² is such that a current of seventy-five (75) milliamperes flowing through their coils will produce a magnetic field at the pole pieces 16 strong enough to attract the armatures 20 to the pole pieces 16. Then, when the current is reduced, without breaking the circuit, to fifty-five (55) milliamperes, the armatures 20 will be held against the pole pieces 16, and the relay contacts remain open until it is desired to close them as hereinbefore stated.

In the latter operation, the operator at either of the stations A or B inserts the metal dummy type of plug connector into either of the jacks J¹ or J², as the case may be, for a second only, and then removes it. This increases the line current to seventy-five (75) milliamperes, which causes relays RL¹ and RL² to attract their armatures 20, which, in turn, opens their contacts 68, 68' and 69, 69' respectively, thereby opening the local power circuits 70 and 70' on the apparatus to be cut out at the sockets 71 and 71', and then, without breaking the circuit, the current is reduced to the normal fifty-five (55) milliamperes, thereby holding both of the armatures of the relays RL¹ and RL² against their pole pieces 16, and the contacts 68, 69 and 68', 69' open until it is desired to again cut in the apparatus connected to the local power circuits 70 and 70'.

In some instances, it may be desired to use the type of cam switch, as shown in Figure 5, at each of the stations A and B, instead of the jack type of switching devices $J^1$ and $J^2$, in which case, the contact springs $33^a$ and $34^a$ thereof correspond to and are for the same purpose as that of the contact springs 33 and 34 of the jacks $J^1$ and $J^2$, while the contact springs $35^a$, $36^a$ and $37^a$ correspond to and are for the same purpose as that of the contact springs 35, 36 and 37 of the jacks $J^1$ and $J^2$, as explained above Therefore, in making use of this cam type of switch, an operator at either of the stations A or B, to effect the cut in of the power circuits 70 and 70', moves the hand lever 45 to the left until stopped by a stop pin (not shown), and then releases it. Now, when the hand lever 45 is moved to the left position, the disk 40 is rotated in a clockwise direction to cause the high part of the peripheral edge of the disk to strike the under side of the crimp of the contact spring $33^a$, thereby causing it to break contact with contact spring $34^a$, and consequently to disconnect the negative pole of the generator 57 from the line. This opening of the line causes both relays $RL^1$ and $RL^2$ to become de-energized. When the relays $RL^1$ and $RL^2$ are de-energized, the contacts 68 and 69 of relay $RL^1$, and the contacts 68' and 69' of relay $RL^2$ close, and thereby close the local power circuits 70 and 70' on the apparatus to be cut in at the sockets 71 and 71'. By now releasing the hand lever 45, the cam disk 40 is returned to its normal position by means of the springs 46 and 47, and the spring detent or the like 48 will engage the upper notch 41, and keep the disk in such position. When the cam disk 40 returns to its normal position, the negative pole of the generator 57 is again connected to the line circuit, and a current of fifty-five (55) milliamperes again flows through the circuit, as explained before.

To cut out the local power circuits 70 and 70', the operator at either of the stations A or B moves the hand lever 45 to its right position until stopped by a stop pin (not shown), and then releases it, when the disk 40 is rotated in an anti-clockwise direction to cause the high part of the peripheral edge of the disk to strike the under surface of the crimp of the contact spring $35^a$, thereby causing it to move to and make contact with contact spring $37^a$ before having actually broke contact with the contact spring $36^a$, which occurs upon the completion of the hand lever stroke to the right position. When the contact spring $35^a$ touches the contact spring $37^a$, a current of seventy-five (75) milliamperes will flow from the generator 57 through the circuit, as explained above, causing the armatures of the relays $RL^1$ and $RL^2$ to be held against their pole pieces, thereby opening contacts 68, 69, 68' and 69', which, in turn, opens the local power circuits 70 and 70', rendering the apparatus connected to the sockets 71 and 71' inoperative. By now releasing the handle 45, the cam switch is restored to normal by means of the springs 46 and 47 and the spring and the spring detent or the like 48 will engage in the upper notch 41, and keep the cam switch in its neutral position. When the cam switch is restored to its normal position, the contact spring $35^a$ is in contact with the contact spring $36^a$, thereby sending a current of fifty-five (55) milliamperes through the circuit as above explained, which keeps the relay armatures at both stations held to their pole pieces, the relay contacts open, and the electric power circuits 70 and 70' also open, and until it is again desired to cut on the apparatus connected to the sockets 71 and 71'.

Again, in certain instances of the invention, it may be desired or become necessary to use the three-point switch, as shown in Figure 6, at each of the stations A and B, in place of either the cam switch device (Figure 5), or the jack type of switching devices $J^1$ and $J^2$. In this event, the operator at either of the stations A or B moves the switch lever 50 to the left, and into engagement with the contact point $36^c$, and then returns the same to normal position at the middle contact point $35^c$. This opens the line circuit, thereby de-energizing the relays $RL^1$ and $RL^2$ momentarily, which causes their contacts 68, 69 and 68', 69' to close, thereby closing the local power circuits 70 and 70' on the apparatus connected to the sockets 71 and 71'; then when the switch lever 50 is returned to its normal position, that is, on the middle contact point $35^c$, the normal current of fifty-five (55) milliamperes will flow through the line circuit, but the relay armatures will remain at rest against their back stops 18 until it is desired to have the apparatus connected to sockets 71 and 71' cut off.

To effect the cut out of the device operated from the sockets 71 and 71' in the power circuits 70 and 70', the operator at either of the stations A or B places the switch lever 50 to the right contact point $37^c$ for a second, and then returns it to the middle or normal contact point $35^c$. This momentarily increases the line current to seventy-five (75) milliamperes, thereby causing the relays $RL^1$ and $RL^2$ to attract their armatures, which, in turn, open through contacts 68, 69 and 68' and 69', thereby opening the local power circuits 70 and 70', and rendering the apparatus connected to the sockets 71 and 71' inoperative until it is desired to cut the apparatus on again. When the switch lever 50 is placed back to its normal position on contact $35^c$, the normal current of fifty-five (55) milliamperes will again flow through the line circuit.

It is to be here noted that the switch lever 50, when being moved to the left-hand position, makes contact with contact point 36° before breaking contact with contact point 35°, which occurs when the switch lever reaches full left-hand position. The switch lever 50, when being moved to the right-hand position, similarly makes contact with contact point 37° before breaking contact with contact point 35°, which occurs when the switch lever is moved to its extreme right-hand position on contact point 37°.

Referring now to Figure 7, the invention is shown therein as it appears when installed on a Western Union simplex circuit (Table 31-A), only one station hook-up being illustrated for sake of clearness of description. In this hook-up, the jack switches J⁶, J⁷ and J⁸ are the regular 31-A table jacks, the jack J⁷ being the regular meter jack, and when the invention is installed, the jack J³ is the added jack. This added jack J³, together with a metal dummy type of plug connector (not shown) and a fiber dummy type of plug connector (not shown) controls the values of the line current at different periods in the operation of the circuit. The jack J³ may have either the cam switching device, as shown in Figure 5, or the three point switching device, as shown in Figure 6, substituted for the same whenever such substitution may become necessary, or be desired for various reasons. In addition to the added jack J³, the invention makes use of a relay RL³, which is preferably in the form of a Western Union synchronizing unit discarded break relay, and a receptacle 72 is employed for receiving an added resistance element (not shown), in addition to the usual receptacle 73 for receiving a usual resistance element (not shown), the latter resistance preferably having a value such that the line current will normally be fifty-five (55) milliamperes, or any other current value as may become necessary or desired, and the former resistance element, a value that when it is desired at either of the two stations to cut out the apparatus being operated on the local power circuits, as hereinbefore explained, and the jack J³, or other substituted switching device is operated to the "cut-out" position, the line current will increase to seventy-five (75) milliamperes, or any other current value as may become necessary or desired.

In the single station hook-up shown, the following are the circuit connections which are not changed or disturbed in the particular circuit as heretofore constituted. The conductor 74 leading from the contact spring 75, of the meter jack J⁷, to the terminal 76 of the connector block 77, and the line conductor 78 leading from the terminal 76. The conductor 79, connecting the contact spring 75 of the meter jack J⁷ to the contact spring 80' of the same, and the conductor 81 connecting the contact spring 80, of the meter jack J⁷ to the contact spring 82 of the jack J⁸. The conductor 83 connecting contact spring 82 of the jack J⁸ to the connector terminal 84 of the meter jack J⁷. The conductor 85 connecting terminals 86, 87, 88 and 89 of the connector block 77; the conductor 90 connecting terminals 91, 92, 93 and 94, of the connector block 77; the conductor 95 connecting terminal 96 of the connector block 77 to negative line 95'; the conductor 97 connecting terminal 86 of the connector block 77 to the negative connection of a one hundred and ten volt (110 v.) battery switch 98; and the conductor 99 connecting terminal 91 of the connector block 77 to the positive terminal of the battery switch 98. It is to be here noted that the conductor 95 leading from the terminal 96, of the connector block 77 will, at the other station (not shown) lead to a ground connection, rather than to the negative line 95'. The conductor 100, connecting the negative terminals of both of the plug receptacles 101 and 102, a conductor 103 connecting the positive terminals thereof, the receptacle 101 being the one usually receiving the plug connector (not shown) of the signal light circuit, and the receptacle 102 the plug connector (not shown) of the simplex motor circuit. The conductor 104 connecting the positive terminal of the plug receptacle 101 to the terminal 93 of the connector block 77, and the power leads 105 and 106 connecting the one hundred and ten volt (110 v.) switch 98.

In addition to the foregoing, the following conductors of the original circuit are changed or otherwise disturbed to wit: The conductor 107 usually connecting the connection terminal 108 of the jack J⁸ is changed to connect the main spring contact 33" of the added jack switch J³ to one terminal of the resistance receptacle 73. The conductor 109, usually connecting the terminal 88, of the connector block 77, to the negative side of the signal light circuit plug receptacle 101, being changed to connect the said terminal 88 to the contact spring 110 of the relay RL³.

To further modify the circuit to accord with the demands of the present invention, the following conductors are added, namely, a conductor 111 leading from the connection terminal 108 of the jack switch J⁸ to one terminal of the coil of the relay RL³; a conductor 112 leading from the remaining terminal of the relay coil to the spring contact 35" of the control jack J³; a conductor 113 leading from the connection terminal 39" of the jack J³ to the contact spring 34" of the latter; a conductor 114 connecting the hitherto unconnected terminal of the resistance receptacle 73 to the spring contact 36" of the control jack J³; a conductor 115 connecting the remaining terminal of the added resistance receptacle 72 to the spring contact 37" of the control jack J³; and a conductor 116 connecting the terminal 96 of the connector block 77 to the connection terminal 39'' of the control jack J³. Here it is to be noted that a usual conductor (not shown) of the original of this hook-up, and which connects one terminal of the resistance terminal 73 with the terminal 96 of the connector block 77, has been eliminated. A conductor 117 connects the remaining terminal of the added resistance receptacle 73 at the side thereof to which the conductor 107 leading from the main spring contact 33'' of the jack switch J³ is connected, and another conductor 118 connects the negative side of the simplex motor plug receptacle 102 to the relay contact 68'' of the relay RL³.

Referring now to Figure 8, wherein a local hook-up for each of two stations is shown, as when the stations are connected together by means of a duplex line, it is first to be noted that, as in the case of the Western Union duplex simplex tables, the right hand or marking contact of the main line or receiving relay RL⁴ is not used, so as to meet the requirements for the duplex line circuits. As shown, RL⁴ is the receiving relay, 119 its tongue, 120 its spacing contact, and 121 its marking contact. The controlling device relay RL⁵ consists of the armature 122 upon which are two fiber studs 123 and 124, an upper set of spring contacts 125 and 126, and a lower set of spring contacts 127 and 128. The upper contact springs 125 and 126 also serve the purpose of the armature reactile springs. The switch button 129 consists of a contact spring 130 and a contact spring 131, which normally make contact one with the other, and 132 is a fiber button to open the contacts when necessary. A resistance unit 133 is connected in series with the coil 134 of the control relay RL⁵ and to ground, for the purpose of regulating the relay operating current to fifty (50) milliamperes. Located near the transmitting simplex machine is a standard snap switch (not shown) for cutting off and on the current to the said machine. These devices are connected in circuit, as follows: A negative lead 135 connects the tongue 119, of the receiving relay RL⁴, and has a branch conductor 136 connecting the contact spring 131 of the switch button 129. A conductor 137 connects the spacing contact 120, of the receiving relay RL⁴ to the spring contact 128 of the control relay RL⁵, while a branch conductor 138 connects the conductor 137 at a point intermediate its ends to one side of the coil 134 of the control relay RL⁵, which has its opposite end connected to the adjacent end of the resistance 133. A conductor 139 connects the spring contact 130, of the switch button 129 to the upper spring contact 126 of the control relay RL⁵. The upper spring contact 125 of the control relay RL⁵ is connected by a power circuit lead 140 in which is incorporated a receptacle 141 for receiving the plug connector (not shown) of the simplex motor employed for operating the receiving simplex machine, while the remaining spring contact 127 is connected by the other power circuit lead 142.

To effect the cut-in of local motor circuits to be controlled from either of two stations of this character, an operator at either of the stations first turns the snap switch aforesaid to the "on" position, thereby cutting on the transmitting simplex motor (not shown), and next will depress any of the keyboard keys, preferably the spacing key on the transmitting simplex machine (not shown). This causes the receiving relay RL⁴ at the distant station to move its tongue 119 from the contact 120, when transmitting station is idle, the tongue 119 remains on the contact 120 to the contact 121, thereby causing a current of fifty (50) milliamperes to flow from negative lead to the tongue 119 of the receiving relay, and from thence to the closed contact 120, through the one hundred and three (103) ohm coil 134 of the controlling relay RL⁵, through resistance 133 to ground, thereby energizing the relay RL⁵ and closing both sets of contacts 125, 127 and 126, 128. The closing of the contacts 126 and 128 sets up a locking current of fifty (50) milliamperes from the negative side of the line to the tongue 119 of the receiving relay RL⁴, through closed contacts 130 and 131 of the switch 129, through closed contacts 126 and 128, through the one hundred and three (103) ohm coil 134 of the controlling relay RL⁵, through resistance 133 to ground, thereby locking the relay RL⁵ in energized position, and until it is desired to have the receiving simplex motor cut off.

To effect the cutting out of power to the local motor circuits, the transmitting operator, having nothing else to transmit, will notify the distant station by sending the usual two period (. .) signal, and will then turn the snap switch (not shown) for the transmitting simplex machine motor to the "off" position, thereby transmitting the transmitting simplex machine motor. The receiving operator, observing the two period (. .) signal on the receiving tape (not shown) depresses the fiber button 132 on the switch 129, thereby opening contacts 130 and 131, which opens the locking circuit through the controlling relay RL⁵, thereby causing the relay armature 122 to return to a position of rest against its back stop (not shown), which movement is effected by the action of the contact springs 125 and 126, and thereby cutting off the simplex receiving motor on the receiving side, and keeping the locking circuit open. The operator then releases the operating button 132 of the switching device 129, since the locking circuit is open at the contacts 126 and 128. In this condition the circuit is restored to normal, and is ready for the next cut-in operation.

Without further description, it is thought that the features and advantages of the invention will be readily apparent to those skilled in the art, and it will of course be understood that changes in the circuit connections, and in the type and value of the devices employed may be resorted to, without departing from the spirit of the invention or its scope as claimed.

Having thus fully described the invention what is claimed is:

1. In electric power circuit control systems of the class described, a normally open local power circuit at each of two stations, an automatic switching device for controlling each of the said local circuits, a normally closed control circuit at each of the said stations, one inter-connected with the other and with the said automatic switching devices, switching means in each of the said control circuits, and means for actuating said last named switching means whereby either of the same may be operated to first momentarily open both of the said control circuits to cause the said automatic switching devices to close the said local circuits, then to reclose the said control circuits without affecting the said automatic switching devices, said switching means being thereafter operable to momentarily effect an increase in the value of the current in the said control circuits to again cause the said automatic switching devices to operate and open both of the said local circuits, and thereafter to reduce the current to its normal value without affecting the said automatic switching devices.

2. In electric power circuit control systems of the class described, a normally open local power circuit at each of two stations, a relay for controlling each of the said local circuits, a normally closed control circuit at each of the said stations, one interconnected with the other with the said relays, and switching means in each of the said control circuits, and manually controlled means for actuating said switching means whereby either of the same may be operated to first momentarily open both of the said control circuits to cause the said relays to close the said local circuits, then to reclose the said control circuits without affecting the said relays, said switching means being thereafter operable to momentarily effect an increase in the value of the current in the said control circuits to again cause the said relays to operate and open both of the said local circuits and thereafter to reduce the current to its normal value without affecting the said relays.

3. In electric power circuit control systems of the class described, a normally open local power circuit at each of two stations, a relay for controlling each of said local circuits, a normally closed control circuit at each of the said stations, one interconnected with the other and with the said relays, in each of the said control circuits, and interchangeable means for actuating said switching means whereby either of the same may be operated to first momentarily open both of the said control circuits to cause the said relays to close the said local circuits, then to reclose the said control circuits without affecting the said relays, said manually controlled switches being thereafter operable to momentarily effect an increase in the value of the current in the said control circuits to again cause the said relay to operate and open both of the said local circuits and thereafter to reduce the current to its normal value without affecting the said relays.

4. In electric power control systems of the class described, a normally open local power circuit at each of two stations, a relay for controlling each of the said local circuits, a normally closed control circuit at each of the said stations, one interconnected with the other and with the said relays, switches in each of the said control circuits whereby either of the same may be operated to first momentarily open both of the said control circuits to cause the said relays to close the said local circuits, then to reclose the said control circuits without affecting the said relays, the selected switch being thereafter operable to momentarily effect an increase in the value of the current in the said control circuits to again cause the said relay to operate and open both of the said local circuits, and thereafter to reduce the current to its normal value without affecting the said relays and a manually operable cam for actuating each of said switches.

5. In electric power circuit control systems of the class described, a normally open local power circuit at each station of the said system, electrically operated control means for each station, control switches at each station whereby one of the same may be momentarily operated to cause said control means to first close said power circuits at all of the said stations, the actuated control switch being then returned to normal position without disturbing said control means from their power circuit closing positions, said control switch being thereafter momentarily operable to cause said control means to return said power circuits to normal open state, and cam means for actuating said control switches.

6. In electric power circuit control systems of the class described, a relay controlled normally open power circuit at each station of the said system, resistances of a different ohmic value arranged in parallel connection with each relay, control switches at each of the said stations whereby either of the same may be operated to first momentarily open the circuit on said relays to cause the same to close the said power circuits, then to reclose the said circuit without affecting said relays, one or the other of the said control switches being thereafter momentarily operable to connect one of the said resistances in circuit to effect an increase in the value of the current to again cause the said relays to operate and thereby return said power circuit to normally open state and a cam means for actuating each of said control switches.

FRED M. ANDERSON.